Figure 1:
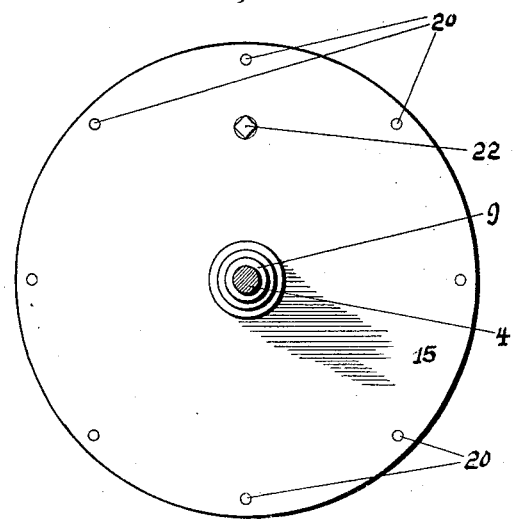

No. 865,469.                                                                 PATENTED SEPT. 10, 1907.
E. E. WRIGHT.
CLUTCH.
APPLICATION FILED OCT. 27, 1906.

Witnesses.

Inventor,
Earl E. Wright,
By
Attorneys.

UNITED STATES PATENT OFFICE.

EARL E. WRIGHT, OF MANSFIELD, OHIO.

CLUTCH.

No. 865,469.      Specification of Letters Patent.      Patented Sept. 10, 1907.

Application filed October 27, 1906. Serial No. 340,832.

*To all whom it may concern:*

Be it known that I, EARL E. WRIGHT, a citizen of the United States of America, residing at Mansfield, in the county of Richland and State of Ohio, have invented certain new and useful Improvements in Clutches, of which the following is a specification, reference being had therein to the accompanying drawing.

This invention relates to clutches, and the invention has for its primary object to provide a novel form of clutch wherein the gripping power of the same can be increased or decreased according to the work to be performed by the clutch.

Another object of this invention is to provide a clutch wherein positive and reliable means are employed for insuring a perfect frictional contact of one part of the clutch with another part.

To this end, I have devised a simple and inexpensive clutch made of a plurality of parts easily and quickly assembled and disassembled, the clutch being designed whereby it can be easily enlarged or decreased in size in accordance with the amount of work to be performed by the clutch.

The detail construction of my clutch will be presently described and then specifically pointed out in the claims.

Referring to the drawing forming a part of this specification, like numerals of reference designate corresponding parts throughout the several views, in which—

Figure 2:
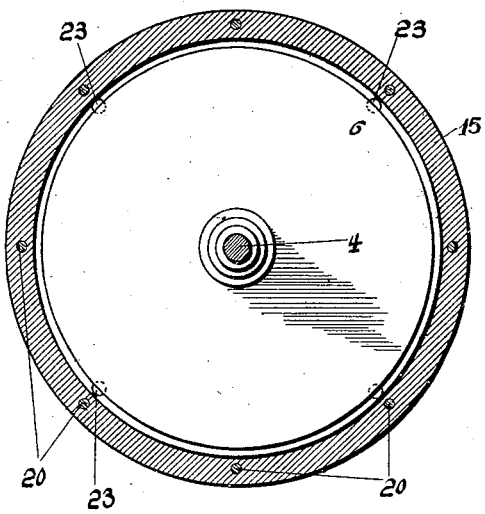
Figure 3:
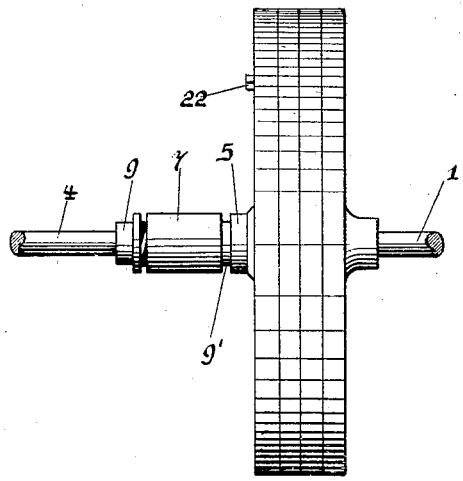
Figure 4:
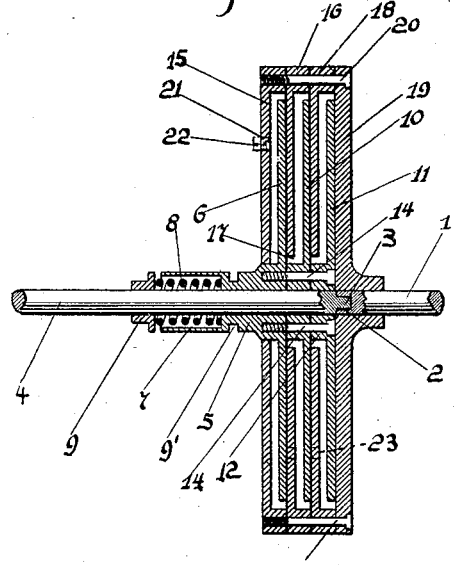

Figure 1 is a front elevation of my improved clutch, Fig. 2 is a vertical sectional view of the same, Fig. 3 is a side elevation of the clutch, and Fig. 4 is a cross sectional view of the same.

In the accompanying drawings, the reference numeral 1 designates the drive shaft of a suitable engine, the end of said shaft being provided with a socket 2 to receive the cylindrical contracted end 3 of a transmission or driven shaft 4. Upon the transmission shaft 4 is slidably mounted a hub 5 carrying at its one end a large disk 6, while at its opposite end is formed the sleeve or housing 7 for a coil spring 8, which bears against a collar 9 secured to the transmission shaft 4. The hub 5 intermediate the housing 7 and the disk 6 is provided with an annular groove 9', to receive the forked end of a lever (not shown) employed for operating my clutch.

Upon the end of the transmission shaft 4 adjacent to the disk 6 I mount disks 10 and 11, these disks having a diameter equivalent to the disk 6 and hub portions 12. The disks 10 and 11 are secured to the hub 5 by screw bolts 14 passing through the hubs 12 and engaging in the hub 5, said screw bolts having countersunk heads. The disks 6, 10 and 11 being all connected together, slide upon the transmission shaft 4, and reference will now be had to those elements carried by the drive or engine shaft 1.

Upon the hub 5 is mounted a circular recess plate 15 adapted to house the disk 6. Prior to placing the disks 10 and 11 upon the transmission shaft 4, I place a circular recess plate 16 upon the plate 15, the plate 16 engaging the back of the disk 6, and having a central opening 17 whereby the hub 12 of the disk 10 can be placed in engagement with the hub 5. Another plate 18 similar to the plate 16 is now placed in engagement with the back of the disk 10, and then the disk 11 is placed upon the transmission shaft 4. After the plates 15, 16 and 18 have been so assembled, a circular head 19 is connected to the plates 15, 16 and 18 by screw bolts 20, said screw bolts retaining the plates 15, 16 and 18 in position to house the disks 6, 10 and 11.

The head 19 is keyed or suitably fixed to the drive or engine shaft 1, whereby when said shaft revolves, the plates 15, 16 and 18 will be revolved therewith.

The outer plate 15 is provided with a screw-threaded port 21 normally closed by the plug 22. The plates 16 and 18 are provided with openings 23. The screw-threaded port 21 is provided whereby suitable lubricating oil may be injected into the clutch, while the openings 23 permit of the oil circulating between the disks and plates. When the clutch is being revolved the oil will be quickly distributed throughout the clutch and permit of the clutch being easily operated.

In operation, the hub 5 is moved upon the transmission shaft 4 to disengage the disks 6, 10 and 11 from the plates 15 and 16 and 18 to permit of the shaft 1 rotating independently of the shaft 4. The coil spring 8 normally holds the disks 6, 10 and 11 in engagement with the plates 16, 18 and the head 19, whereby the transmission shaft 4 will rotate with the shaft 1. To prevent the disks 6, 10 and 11 from contacting with the opposite faces of the plates 15, 16 and 18, I have mounted a collar 9 in close proximity to the housing 7 whereby the outward movement of the housing will be limited, thus centering the disks 6, 10 and 11 between the plates 15, 16 and 18.

By the novel construction of my improved clutch, it will be observed that I have provided a large gripping surface for the contacting plates and disks, besides providing a construction which permits of a number of disks and plates being increased or decreased, it being understood that when the disks and plates are to be increased in number that the hub 5 is placed upon the shaft 4 a sufficient distance from the end thereof to permit of additional disks and plates being mounted thereon.

A particular feature of my invention resides in the fact that I have dispensed with any particular wearing point about the clutch, the frictional contacting surfaces thereof being equally distributed throughout the clutch, thereby insuring a more positive operation than if the contact points were diametrically opposite as in the ordinary type of shoe clutch.

The clutch is preferably constructed of strong and durable metal, and I do not care to confine myself to its specific use or construction.

Having fully described my invention, what I claim as new and desire to secure by Letters Patent is:—

1. In a clutch, a drive shaft, and a driven shaft connected thereto, a hub on the driven shaft, a disk carried by the inner end of the said hub, a plurality of disks mounted on the driven shaft and connected to the said hub to rotate in unison therewith, a plate mounted on the hub to revolve independently thereof, a plate keyed to the drive shaft, a plurality of plates interposed between the first named plates and securely fastened thereto to revolve therewith, and a spring on the driven shaft normally holding said plurality of plates in frictional engagement with the disks.

2. In a clutch, a drive shaft, and a driven shaft connected thereto, a hub on the driven shaft, a disk carried by the inner end of said hub, a second disk mounted on the driven shaft and connected to said hub to rotate in unison therewith, a plate mounted on the hub to revolve independently thereof, a plate keyed to the drive shaft, a second plate interposed between said first named plates and securely fastened thereto to revolve therewith, and a spring on the driven shaft normally holding said second named disk in engagement with the said interposed plate.

3. In a clutch, a drive shaft, and a driven shaft connected thereto, a hub free to revolve on the driven shaft and having sleeve or housing on one end, a disk carried by the opposite end of said hub, a plurality of disks mounted on the driven shaft and connected with said hub to rotate in unison therewith, a plate mounted on the hub to revolve independently thereof, a second plate keyed to the drive shaft, a plurality of plates interposed between said first named plates and connected adjacent their peripheries to said first named plates so as to revolve in unison therewith, a collar on the driven shaft, and a spring within the sleeve or housing of said hub having its one end abutting said collar and normally holding the interposed plates and disks in frictional engagement.

In testimony whereof I affix my signature in the presence of two witnesses.

EARL E. WRIGHT.

Witnesses:
MAX H. SROLOVITZ,
K. H. BUTLER.